United States Patent
Chambers et al.

(10) Patent No.: US 6,820,382 B1
(45) Date of Patent: Nov. 23, 2004

(54) FIRE STOP AND ITS USE

(75) Inventors: David C. Chambers, St. Paul, MN (US); Laurence M. Whitty, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 10/018,158

(22) PCT Filed: May 3, 2000

(86) PCT No.: PCT/US00/12034

§ 371 (c)(1),
(2), (4) Date: Nov. 2, 2001

(87) PCT Pub. No.: WO00/67849

PCT Pub. Date: Nov. 16, 2000

(51) Int. Cl.$^7$ ................................. E04C 2/00
(52) U.S. Cl. .................... 52/232; 52/741.3; 52/745.21; 428/40.1; 428/195; 156/62; 156/250
(58) Field of Search .................. 52/232, 220.8, 52/712, 741.3, 745.21; 428/77, 319.1, 343, 920, 921, 40.1, 195; 156/62, 250

(56) References Cited

U.S. PATENT DOCUMENTS

| | | | |
|---|---|---|---|
| 4,048,363 A | * 9/1977 | Langer et al. | ................. 428/77 |
| 4,265,953 A | * 5/1981 | Close | ........................... 428/78 |
| 4,273,821 A | 6/1981 | Pedlow | |
| 4,748,066 A | * 5/1988 | Kelly et al. | .................. 428/182 |
| 4,999,168 A | * 3/1991 | Ten Eyck | .................... 422/179 |
| 5,035,097 A | * 7/1991 | Cornwall | .................... 52/220.8 |
| 5,378,530 A | 1/1995 | Metivaud et al. | |
| 5,634,304 A | 6/1997 | Sakno | |
| 5,654,063 A | * 8/1997 | Kirk et al. | .................. 52/220.8 |
| 5,830,319 A | 11/1998 | Landin | |
| 5,961,766 A | * 10/1999 | Chang et al. | ................ 156/247 |
| 6,360,502 B1 | * 3/2002 | Stahl, Jr. | ....................... 52/232 |
| 6,405,502 B1 | * 6/2002 | Cornwall | .................... 52/220.8 |
| 6,470,635 B2 | * 10/2002 | Cornwall | .................... 52/220.8 |

FOREIGN PATENT DOCUMENTS

| | | |
|---|---|---|
| CA | 2111545 A1 | 6/1995 |
| EP | 0 476 945 A1 | 3/1992 |
| GB | 2 181 093 A | 4/1987 |
| GB | 2 222 916 A | 3/1990 |
| WO | WO 94/20055 | 9/1994 |
| WO | WO 00/23513 A | 4/2000 |

* cited by examiner

Primary Examiner—Carl D. Friedman
Assistant Examiner—Chi Q. Nguyen
(74) Attorney, Agent, or Firm—David B. Patchett

(57) ABSTRACT

The invention provides a device for use as a fire stop, which comprises a material that intumesces on exposure to heat, a patch of an adhesive connected to a surface of the material and a liner that covers the adhesive and is readily detachable from the adhesive by means of a pull, to expose the adhesive.

8 Claims, 3 Drawing Sheets

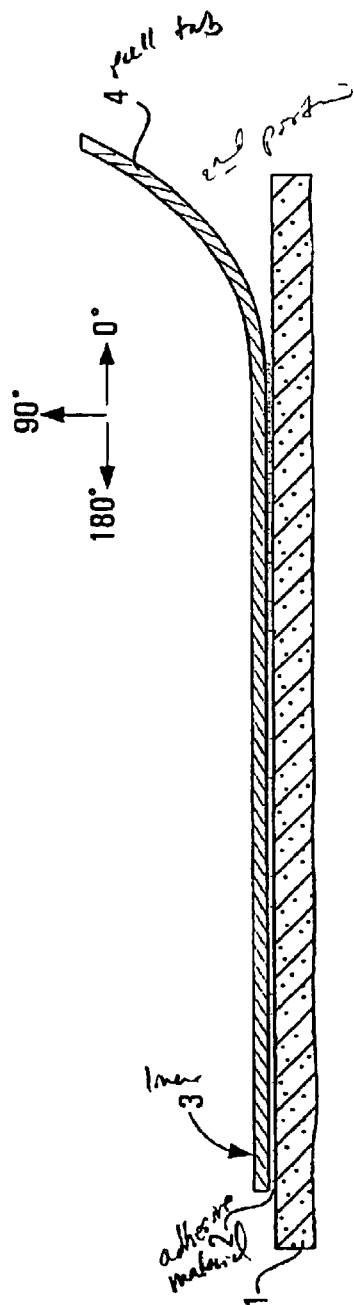
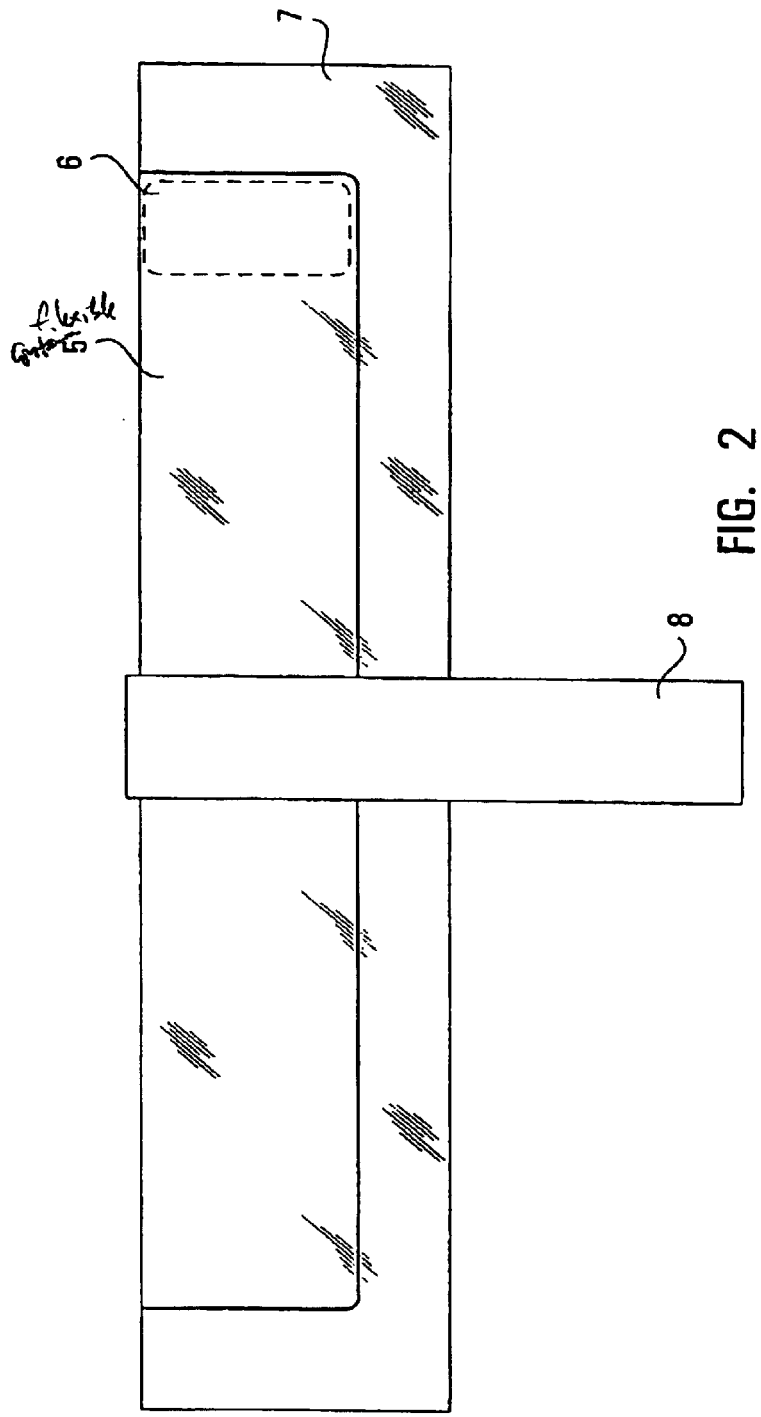
FIG. 1
FIG. 2

FIRE STOP AND ITS USE

CROSS REFERENCE TO RELATED APPLICATIONS

This application claims priority to International Application No. PCT/US00/12034, filed May 3, 2000, which was published under PCT Article 21(2) in English, and which claims priority to Canadian Application No. 2,271,229, filed May 7, 1999.

The present invention relates to devices for use in making fire stops in buildings, and to a method of using the devices.

Partitions in general, including walls, floors and ceilings in buildings, may have holes in them for passage of items such as vent pipes, drain pipes, plumbing pipes, gas pipes, electrical wiring, conduits to contain electrical telephone and computer wiring, optical fibre, air conditioning ducts, heating ducts and the like. One hole may accommodate one or several such items. Annular spaces between the hole and the item passing through the hole create passages through which heat and fire can spread, especially if a pipe collapses or burns under the influence of heat. It is therefore desired to provide means for filling or blocking these spaces to prevent the spread of heat and fire through the holes. There are devices and materials known for this purpose. These have the disadvantages as they are cumbersome to apply, require tools and skills for their installation, and may require use of metal frames and screws or grout or caulking for their permanent installation. They may require that a seal to prevent passage of heat and fire is formed at the moment of installation. Such devices and materials make reentry to repair or to retro-fit piping and cabling systems difficult. Furthermore, in many cases subsequent visual inspection does not readily reveal whether the device or material has been properly installed or not.

It is an object of the present invention to alleviate some or all of the above-mentioned disadvantages.

SUMMARY OF THE INVENTION

The present invention provides a device that comprises a material that intumesces on exposure to heat, a patch of an adhesive connected to one surface of the intumescent material and a liner that covers the adhesive and is readily detachable from the adhesive by means of a pull, to expose the adhesive.

In another aspect the invention provides a method of providing a fire stop in a space between a hole in a partition and an item passing through the hole, which method comprises wrapping around the item a device as defined above, sliding the device along the item into the hole and pulling on the pull tab to expose adhesive and anchor the device permanently on the item by means of the adhesive.

DESCRIPTION OF PREFERRED EMBODIMENTS OF THE INVENTION

In the description of preferred embodiments that follows, for purposes of illustration reference is made to a pipe passing through a hole. It should be appreciated that the pipe is merely representative of items that may pass through a hole, and examples of such items are mentioned above.

When the device is in place in a hole and heat from fire is encountered, the intumescent material swells markedly, thereby blocking the hole and preventing passage of heat, flame, smoke and the like. Suitable intumescent materials include flexible fire barrier felts that are disclosed in U.S. Pat. No. 5,830,319, the disclosure of which is incorporated by reference. The felt comprises an organic polymeric binder, organic fibres having pendant hydroxyl groups, for example cellulosic fibres, a heat absorbing compound that is suitably an intumescent compound, for example intercalated graphite, mica, perlite, vermiculite, hydrated sodium silicate, and a phosphorus compound.

One such intumescent material that is suitable for use in the present invention is a flexible fire barrier felt that is available from 3M under the trade-mark Interam Ultra GS. It is available in strips about 2 inches wide and about _inch thick in any length. When exposed to temperatures of at least 300° F. (149° C.) it intumesces rapidly, expanding up to approximately 25 times its original volume. It turns into a hard char that impedes or prevents passage of heat, fire, smoke and gases. The material exerts substantial pressures on items in the hole so that it compresses piping and wiring materials, thus further effecting a seal of the hole against fire, heat, smoke and the like. It also releases chemically bound water that helps to slow temperature rise.

In one simple embodiment of the invention, suitable for use with small holes and small pipes, the patch of adhesive is present directly on a surface of a strip of an intumescent fire barrier felt. The liner is removed from the patch of adhesive, the felt is flexed to permit it to be pushed into the hole and the adhesive attaches either to the exterior surface of the pipe or the interior surface of the hole, where it is held permanently in place. In another simple embodiment the intumescent felt strip is contained in a coating of, for example, a plastic sheet, woven fabric or, preferably, aluminum foil and the adhesive patch is on the coating. The intumescent felt material and the adhesive are operatively connected to each other via the coating, although not in direct physical contact. The coating contains the intumescent material when it first encounters heat and intumesces, so that the expanded material remains contained in the hole and blocks the hole, rather than perhaps being blown around by a fire draught and leaving the hole unblocked. These embodiments are more suited for use with small pipes, up to about 1 inch nominal diameter, and small holes, up to about 1½ inch nominal diameter.

For use with pipes larger than 1 inch and holes larger than 1½ inch it is preferred to enclose the intumescent material in a container.

The container surrounding the intumescent material is preferably flexible and has a certain degree of strength. Suitable materials for the flexible container include plastics materials and mention is made of polyolefins, particularly polyethylene, which heat will melt and may assist in sealing. Another flexible container material that can be used is a metal foil, such as aluminum foil. Yet another material is a fabric, for instance woven fibres of polyamide, polyester, polyolefin, polyacrylate, glass or ceramic or the like. A preferred container, particularly for more stringent conditions, is composed of a thin aluminum sheet or foil attached to a fabric or fiber reinforcing material made of, for instance, polyamide, polyester, glass, ceramic or the like. Suitable materials include fabric net reinforced aluminum foils with polyethylene heat seal layer available from Alpha Associates, Inc., of Woodbridge, N.J., U.S.A particularly the foil available under the designation Alpha) Style 4413-VLS™.

To make a device for use with pipes sizes of about 1½ a inch nominal and greater, the flexible container, when laid flat, is normally elongate and in use is folded to bring one end into contact with the other to form an annulus. In a preferred embodiment the two ends are held in contact by some means. The particular means for holding the ends is not critical. Persons skilled in the art will be able to suggest many possible means for this purpose, for instance a clip or clamp, or tape, or Velcro. Preferred is an adhesive covered with a detachable liner, so that the annulus can be readily made simply by detaching the detachable liner and pressing the two ends of the container together to be held by the adhesive. The demands on this adhesive are not particularly stringent, and suitable adhesives are available from 3M under the designation Scotch™ 467 HiPerformance Adhesive and 468 HiPerformance Adhesive.

A device of the invention can be made by taking a sheet of the flexible material that will form the container. The sheet should be of the approximate length required for the maximum length of the container when flat, plus, if necessary, an allowance for sealing at each end to enclose the intumescent material. It should be of a width sufficient to encompass both the width and the height of the unexpanded intumescent material, plus again, if necessary, an allowance for sealing along one edge. The material can then be folded over the unexpanded intumescent material and sealed along one side and both ends, to form the required enclosure. One suitable way of doing this is by heat sealing, although it is again clear that this could be done by many other means, for instance use of adhesive or even stitching. The flexible container should not be a tight fit over the intumescent material, so that when the intumescent material does swell some of that swelling is accommodated before the flexible container becomes stressed by the swelling. It is important that the flexible container contain the intumescent material as it first swells on encountering the heat, so that the intumescent material stays in place and is trapped in the hole, surrounding the pipe that passes through the hole. The container holds the swelling material for at least this brief initial period of time. Even if a seal bursts or the container subsequently tears the expansion of the intumescent material in the confined space will hold at least the bulk of the expanded material in place and form an effective fire stop.

In order to locate the device permanently around the pipe and in a hole that is to be blocked, use is made of the patch of adhesive that is on one exterior surface of the container. That adhesive can be on the surface that becomes the inner surface when the device is formed into an annulus. The installation of the device is not particularly critical, provided that it adheres to the pipe, as the seal is not formed on installation but is formed only when heat causes the intumescent material to intumesce. On installation the device is wrapped around a pipe to form an annulus, or collar, using the adhesive or other sealing means at either end of the container to form the annulus, then thrust into the hole. Once the device is in the desired location a pull tab, which attaches to or is integral with the liner on the adhesive patch and projects from the hole, is pulled to remove the liner from over the adhesive patch. During insertion of the device in a hole there is usually some degree of friction between the inner surface of the device and the pipe that tends to help in holding the device in place before the exposure of the adhesive patch to form the permanent bond. The adhesive then comes in contact with the pipe and the device is held permanently by the adhesive at the desired location. The pull tab and liner, which at its one end is permanently attached to the container, projects from the hole and serves as a flag or marker to indicate that the device is in place. At this stage, or at any subsequent inspection, the hole can readily be examined visually to see that the device is in place in the hole, as indicated by the flag. Adhesion between the strip of adhesive on the inner surface of the annulus and the outer surface of the pipe can also be checked, of course.

Also within the scope of the invention is a device similar to that described in the immediately preceding paragraph, but differing in having the adhesive patch on the surface that becomes the outer surface when the device is formed into an annulus. With this device the adhesive attaches to the inside of the hole, rather than the exterior of the pipe. One application of this device is in a partition wall composed of studs faced on both sides with gypsum wallboard. For effective fire-stopping it is necessary to use two fire stops, one in each piece of wallboard, or to insert a sleeve that extends through the two pieces of wallboard and spans the gap that is equal to the width of the studs. In this case one fire stop can be inserted in the sleeve, which is, for example, of PVC or of 24 or 28 gauge sheet metal. The device can be held in place by the adhesive patch adhering the outer surface of the device to the inner surface of the sleeve.

As stated above, with the device of the invention the seal to prevent passage of heat, smoke, flame, etc. is not formed on installation, but is formed on exposure to heat causing rapid expansion of the intumescent material. The rapidly expanding intumescent material occupies whatever space is available, so it accommodates awkward shapes with ease. For instance, sometimes in a hole there is a pipe in which there is an elbow or a coupling between two pipes of different diameter, or two or more small pipes passing through one hole. These create awkward shapes and present problems for fire stops composed of rigid material and designed to form a seal immediately on installation. They present no problem with the fire stop of the present invention, however, as the intumescent material expands into whatever shape of space is available to form the required seal.

The intention is that the adhesion between a surface of the fire stop device and the outer surface of the pipe, or the inner surface of the hole, as the case may be, shall be permanent, and shall therefore be able to withstand variations in temperature, exposure to conditions of moisture, lack of humidity, vibration, exposure to gases and any other condition which might tend to reduce or break the adhesion. The demands on this adhesive material are therefore greater than the demands on the material joining the two ends of the container to form an annulus. If the latter adhesion should fail this is of no effect, because the device is still retained in place. In contrast, the adhesive holding the device to the pipe must remain in place and should therefore have the capacity of adhering to materials that have low surface energy. Suitable adhesives are known, for instance, from U.S. Pat. Nos. 5,602,221; 5,616,670 and 5,654,387 the disclosures of which are incorporated herein by reference. One adhesive for this purpose is available from 3M under the trade-mark Scotch 300LSE HiStrength Adhesive. It should be borne in mind that fire stop devices of the same construction might be used on pipes made of many different materials, such as various plastic materials, including but not limited to cellular core PVC (ccPVC), PVC, crosslinked PVC (CPVC), fire resistant polypropylene (FRPP), PVDF, ccABS and ABS, steel, galvanized steel aluminum, copper or mild steel which may have an anticorrosive oil finish, or be painted, and the adhesive should attach permanently and firmly to any of these materials.

Pipes and conduits used in buildings tend to be of certain nominal sizes. There is some variation in external diameter, because diameters quoted are often internal diameters and different pipes for different purposes have different wall thicknesses. The outer diameters of pipes encountered in buildings are clustered in various fairly narrow dimensional ranges, however, and a device of appropriate size is made for each range.

Alternatively, or in addition to sizing devices with regard to the pipe size it is possible to size them with regard to the hole size.

Usually in construction a hole to accommodate a pipe passing through it is sized so that the diameter of the pipe is about 50 to 80% of the diameter of the hole. In this case one appropriately sized device of the invention is all that is needed to form a fire stop. In some instances, however, it is necessary to insert a fire stop where the hole is much larger than the pipe. This is the case particularly when retrofitting, when, say, a 3 inch pipe may have been removed from a hole and in the retrofit a 1 inch pipe is passed through the hole. In such a case it is possible to use two devices of the invention. Immediately around the 1 inch pipe is placed a device appropriately sized for 1 inch pipe, and around that there is placed a second, larger device of the invention. Alternatively the hole can be partially filled with some non-combustible material, for example mineral wool.

As stated above, after installation of the device the pull tab can serve as a flag. The flags can be coded to indicate the size of the device, for instance with different colours.

The invention is further illustrated in the accompanying drawings showing, by way of example, preferred embodiments of the invention, of which:

FIG. 1 illustrates certain characteristics of a liner-covered adhesive that are taken advantage of in some preferred embodiments of the invention;

FIG. 2 shows a flexible container in accordance with the invention in plan view;

FIG. 1 shows a substrate 1 on the surface of which is applied an adhesive material 2 covered with a liner 3 which extends to form a pull tab 4. If a pull is exerted on the pull tab in the direction indicated as 0° in the figure then the shear force resisting removal of the pull tab will be very great and it is more likely that the pull tab will tear than that the adhesive will release. If the pull is in the direction indicated as 90°, i.e., perpendicular to the surface bearing the adhesive, then the force required to remove the liner is considerably less. If the pull is in the direction indicated as 180° the resistance to removal of the liner is also less. The embodiment of the invention that is illustrated in FIGS. 2 to 5 takes advantage of this phenomenon.

Figure 3:
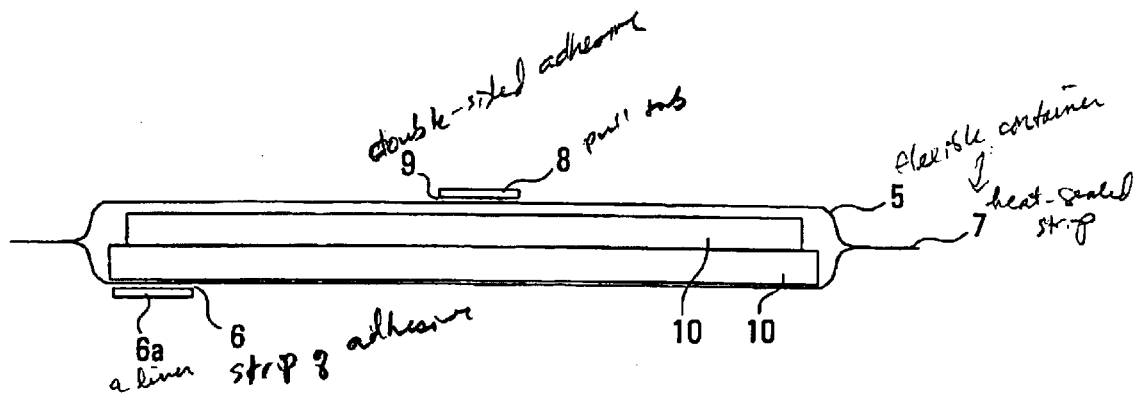
FIG. 3 shows a device of the invention in longitudinal section.
Figure 4:
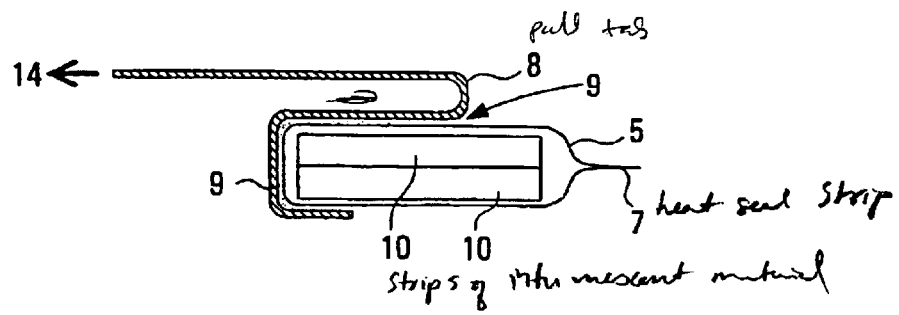
FIG. 4 shows a device of the invention in cross section.

FIGS. 2, 3 and 4 show a device in accordance with the invention before installation. A flexible container 5 encloses strips 10 of intumescent material, the container being closed by a heat-sealed strip 7. At one end of the container is a strip of adhesive 6, temporarily covered by a releasable finer 6a, that will adhere to the other end of the container to hold the two ends when the flexible container is formed into an annulus.

Attached to one surface of the flexible container is a pull tab 8 that, over part of its length, act as a liner over a patch of double-sided adhesive 9 that is on the surface of the container that forms the inner surface when the container forms an annulus. As can be seen from FIG. 4, the liner and pull tab 8 is looped over so that when a pull on the pull tab in the direction of the arrow it is initially at about 180° to the adhesive surface, so that the liner is released relatively easily. As the point of attachment of the liner approaches the edge of the flexible container then the angle approaches 90° and the resistance to release increases. As more of the liner is removed the angle approaches 0° and the resistance to release increases yet further as discussed above. At the point that this further increase in resistance is encountered the patch of adhesive that will contact the pipe is exposed. The adhesive contacts and attaches to the pipe. The pull tab extends from the hole and serves as a flag indicating that a device has been inserted. The device will therefore remain in place. It will be appreciated that its insertion has involved no use of tools, no particular skills, no use of screws, grout or caulking to hold it in place, and it is clearly very easily capable of rapid visual inspection, to determine that it has been installed properly.

The intumescent material inside the container is shown as two strips of intumescent material 10. As stated above, each device is designed for use with pipe of a particular size, and the device shown in FIGS. 2, 3 and 4 is intended for pipe whose external diameter is approximately 2 inches. The intumescent material Interam Ultra GS is available in strips that are approximately 2 inches wide and ⅛ of an inch thick. For a device for use with 2 inch pipe two strips of this material are used, one approximately 7½ inches in length and the other approximately 8¼ inches in length. The one is laid on top of the other and the strips are free to move relatively to each other, although they are, of course, confined within the flexible container. The shorter length of intumescent material is adjacent that side of the foil container that, on its outer surface, bears the adhesive patch 9 and liner S. As the device is wrapped around a pipe the two layers of intumescent material move relatively to each other to accommodate the formation of the annulus. For 2 inch pipe, the flexible container is formed from a sheet that is approximately 10¼ inches long by 7 inches wide, when laid flat. The two layers of intumescent material are laid on this sheet. The sheet is then folded over lengthwise to enclose the intumescent material and heat-sealed along one edge, and to form seal 7 at either end. Adhesive 6 and liner 6a are applied to the one end and the adhesive patch 9 and liner 8 attached thereafter. For 4 inch pipe the flexible container is suitably about 19½ inches long and contains four strips of the Interam Ultra GS intumescent material, the shortest of which is about 14⅜ inches long and the longest of which is about 17 inches long.

Figure 5:
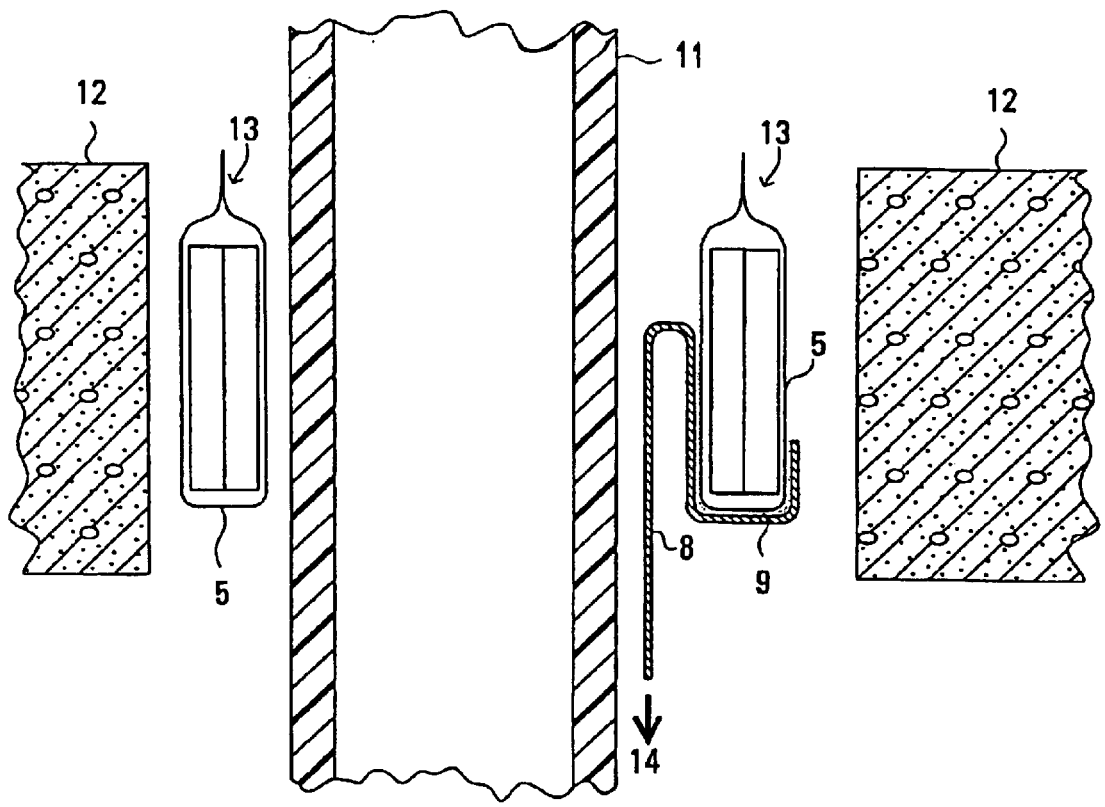
FIG. 5 shows a device in process of installation.

FIG. 5 shows schematically the device in place before removal of the liner 8. A pipe 11 extends through a hole in a concrete wall 12. In the space between the exterior surface of the pipe and the interior of the hole in the concrete there is placed the device of the invention. As can be seen, a pull on the liner in the direction of the arrow will expose the adhesive which then attaches to the pipe. The liner 8 is not completely detached from the device but remains in place and serves as a flag to indicate that the device has been installed.

It is clear from the above description that the adhesive that attaches the device of FIGS. 2 to 6 to the pipe need not extend all around the inner circle of the annulus of the adhesive. The area of the adhesive should be such that, when in place, it occupies a sector of at least about 25° preferably about 50°. The size of this sector does depend to some extent on the size and weight of the device and the pipe around which it is to be wrapped. With a larger device and larger diameter pipe the sector subtended by the adhesive patch can be smaller. Particularly for use in a hole in a floor or ceiling, where gravity will tend to pull on the device, the amount and tenacity of the adhesive should be sufficient to support the weight of the device permanently in a non-friction mode, i.e., without reliance on friction, on a low energy surface.

Figure 6:
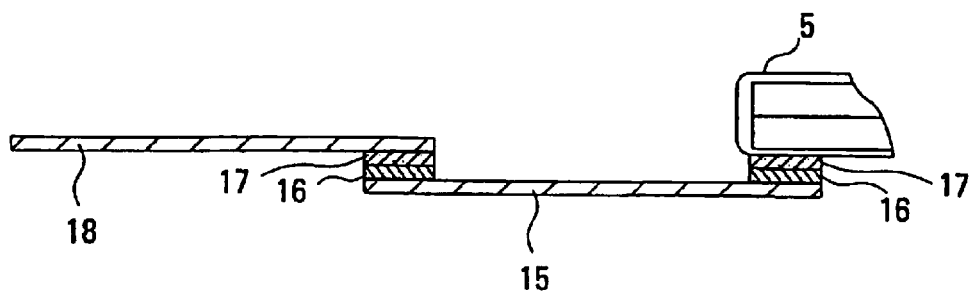
FIG. 6 shows detail of a liner and pull tab.

FIG. 6 shows detail of a preferred embodiment of the liner and pull tab 8, in its orientation after it has been pulled from the adhesive patch 9. The liner and pull tab is composed of a silicone release coated paper 15, i.e., paper coated on both sides with low surface energy silicone so that it will readily release from the adhesive patch 9. As the pull tab 8 is to remain in place as a permanent flag or marker it is necessary that it shall not release from the device as a whole. To enhance the adhesion between the surface of the container 5 and the paper 15 there is used a double-sided adhesive, available from 3M as Double Sided Adhesive 9731. This is composed of a scrim, on one side of which is a layer 16 of Scotch 300LSE HiStrength Adhesive, which adheres well to the silicone release coated paper 15. On the other side of the scrim is a layer 15 of an acrylate adhesive that adheres well to the fabric of container 5. At the other end of the strip of paper 15 there is a strip of plastic sheet 18 that is attached to the paper 15, again using 3MNs Double Sided Adhesive 9731, with the 300LSE HiStrength Adhesive in contact with the paper 15 and the acrylate in contact with the plastic sheet 18.

It will be appreciated that the invention can be embodied in some ways different from that described above with reference to the drawings. For instance, with larger pipe diameter a larger device will be needed and there may be used 3 or 4 or even 5 or more strips of the 1/8 inch thick material Interam Ultra GS. The intumescent material could be in pulverulent form, rather than solid strip form. The manner of sealing the flexible container to contain the intumescent material is not critical, provided that the sealing material does withstand the initial force to sufficient extent to ensure that at least the bulk of the intumescent material remains in place in the annulus between the pipe and the hole and does in fact form a fire stop. The liner and pull tab may be formed of the same material, or, of course, may be made of a composite of several different materials. Suitable materials are sheet plastic and paper, or a combination of the two; clearly the selection of material for this purpose is not critical. The liner and pull tab remain attached to the device, and this can be done by means of adhesive, as described above, or the liner can be anchored at its one extreme end by any other suitable means, for instance stitching, or by remaining the flexible container of a material which is shaped so that when it is folded to enclose the intumescent material there is a tail extending from one surface of the container material, which tail can be folded over to cover the adhesive and serve as liner and pull tab.

Another variant of the embodiment of FIGS. 2 to 6 is to dispense with the pull tab 8 and adhesive batch 9, and to locate the adhesive along the lengthwise strip of the heat-sealed area 7. The adhesive would be covered with a release liner until used. In use the release liner would be removed, the device wrapped around the pipe and slid carefully into the hole and, when properly located, the adhesive on the heat-sealed strip 7 would be pressed either against the exterior of the pipe or the interior of the hole, as required. It will be realised that this embodiment does not provide the flag to indicate installation of the device. Also, as in this embodiment the adhesive is exposed before the device is located, care must be exercised in sliding the device along the pipe to the required location.

In yet another variant, inside the flexible container and partially surrounding the intumescent material is a member of, for example, thick foil or thin metal that directs expansion and flow of expanding material in a particular direction.

What is claimed is:

1. A firestop device comprising:
   (a) intumescent material;
   (b) a container surrounding the intumescent material;
   (c) adhesive arranged on the container; and
   (d) a liner including a first portion covering the adhesive, a second portion arranged in at least partially overlapping relation with the liner first portion, and a tab portion arranged adjacent at the liner second portion, whereby the tab can be pulled to release the liner first portion from the adhesive to expose at least a portion of the adhesive to adhesively bond the device at a desired location.

2. The firestop device of claim 1, wherein one end of the liner is permanently attached to the container, whereby after installation of the device the liner extends to serve as a visible marker of the device.

3. The firestop device of claim 1, wherein the flexible container comprises a fabric net reinforced aluminum foil with polyethylene heat seal layer.

4. The firestop device of claim 1, wherein the intumescent material comprises at least one elongate strip of flexible intumescent fire barrier felt material.

5. The firestop device of claim 1, wherein the ends of the device contact each other to form an annulus, and the device further includes means for holding the ends of the device together.

6. The firestop device of claim 1, wherein the means for holding the ends together comprises adhesive.

7. The firestop device of claim 1, wherein the container is flexible and loosely surrounds the intumescent material, thereby to allow the intumescent material to expand within the container.

8. An elongate flexible firestop device, comprising:
   (a) intumescent material;
   (b) a container surrounding the intumescent material;
   (c) adhesive arranged on the container; and
   (d) a liner including a first portion covering the adhesive, a second portion arranged in at least partially overlapping relation with the liner first portion, and a tab portion arranged adjacent the liner second portion, whereby the tab can be pulled to release the liner first portion from the adhesive to expose at least a portion of the adhesive to adhesively bond the device at a desired location,
wherein the device includes first and second ends having means for holding the ends of the device together, thereby to form an annulus.

* * * * *

UNITED STATES PATENT AND TRADEMARK OFFICE
CERTIFICATE OF CORRECTION

PATENT NO. : 6,820,382 B1
DATED : November 23, 2004
INVENTOR(S) : Chambers, David C.

It is certified that error appears in the above-identified patent and that said Letters Patent is hereby corrected as shown below:

Column 2,
Line 63, after "1½" delete "a";

Column 5,
Line 54, delete "finer", insert in place thereof -- liner --;

Column 6,
Line 29, delete "liner S", insert in place thereof -- liner 8 --;

Column 7,
Line 18, delete "3MNs", insert in place thereof -- 3M's --;
Line 43, delete "remaining", insert in place thereof -- making --;

Column 8,
Line 17, after "adjacent" delete "at".

Signed and Sealed this

Nineteenth Day of April, 2005

JON W. DUDAS
*Director of the United States Patent and Trademark Office*